(12) United States Patent
Tabe et al.

(10) Patent No.: US 7,686,721 B2
(45) Date of Patent: Mar. 30, 2010

(54) BICYCLE CHAINRING

(75) Inventors: Koshi Tabe, Sakai (JP); Masahiro Yamanaka, Izumisano (JP); Toshio Tetsuka, Sakai (JP); Shingo Shiraishi, Sakai (JP); Hideya Inoue, Sakai (JP); Yusuke Nishimoto, Sakai (JP); Atsuhiro Emura, Sakai (JP)

(73) Assignee: Shimano Inc., Osaka (JP)

( * ) Notice: Subject to any disclaimer, the term of this patent is extended or adjusted under 35 U.S.C. 154(b) by 1079 days.

(21) Appl. No.: 11/126,143

(22) Filed: May 11, 2005

(65) Prior Publication Data

US 2006/0258498 A1 Nov. 16, 2006

(51) Int. Cl.
*F16H 55/30* (2006.01)
(52) U.S. Cl. .................. 474/152; 474/116; 474/118; 474/80
(58) Field of Classification Search .......... 474/80, 474/116, 118
See application file for complete search history.

(56) References Cited

U.S. PATENT DOCUMENTS

| 4,240,303 A | * | 12/1980 | Mosley | 474/144 |
| 4,261,214 A | * | 4/1981 | Watanabe et al. | 474/156 |
| 4,332,574 A | * | 6/1982 | Aoyama et al. | 474/161 |
| 5,314,366 A | | 5/1994 | Palm | |
| 5,725,450 A | * | 3/1998 | Huskey | 474/116 |
| 5,772,547 A | | 6/1998 | Terada | |
| 6,102,821 A | | 8/2000 | Makamura | |
| 6,533,690 B2 | * | 3/2003 | Barnett | 474/140 |
| 2004/0092352 A1 | * | 5/2004 | Chiang | 474/160 |

FOREIGN PATENT DOCUMENTS

| CN | 1149112 A | 5/1997 |
| CN | 1153728 A | 7/1997 |
| DE | 202 18 755 U1 | 4/2003 |
| EP | 0 764 575 A2 | 3/1997 |
| EP | 0 765 802 A2 | 4/1997 |
| EP | 1 407 962 A1 | 4/2004 |
| FR | 1013843 A | 9/1952 |
| JP | 63-133488 U | 8/1988 |

* cited by examiner

*Primary Examiner*—Bradley T King
*Assistant Examiner*—James K Hsiao
(74) *Attorney, Agent, or Firm*—Global IP Counselors, LLP

(57) ABSTRACT

A bicycle chainring is formed from a first member and an second member. The first member includes a center rotational axis, a crank attachment portion with a plurality of chainring attachment openings and an annular tooth portion with a plurality of chain engaging gear teeth. The second member disposed around the center rotational axis and is fixedly attached to overlie at least one of the crank attachment portion and the annular tooth portion to reinforce the first member without obstructing access to the chainring attachment openings.

24 Claims, 20 Drawing Sheets

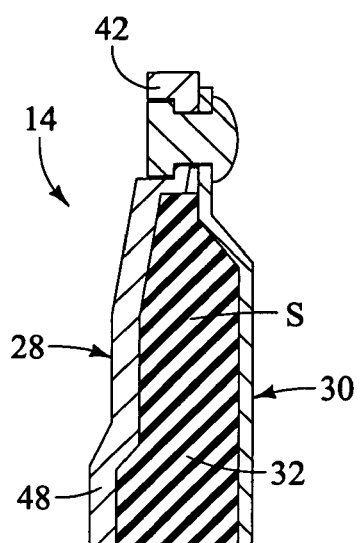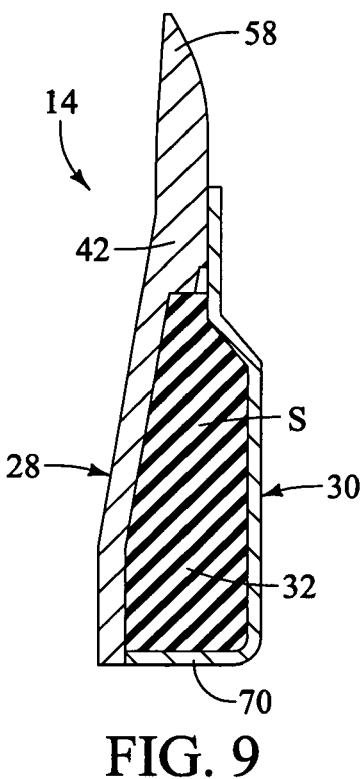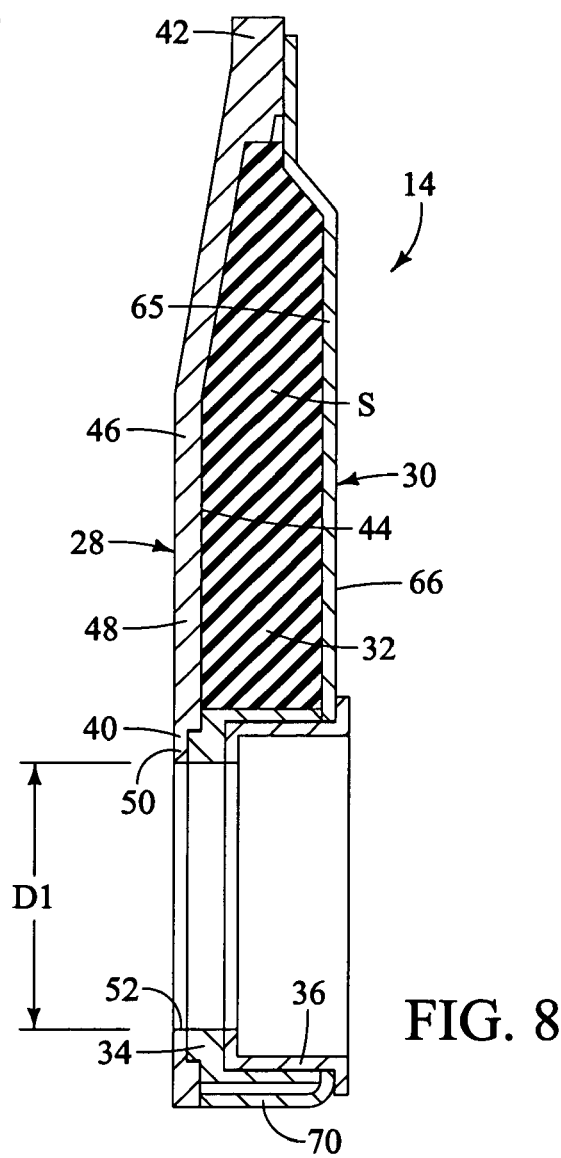
FIG. 7
FIG. 9
FIG. 8

BICYCLE CHAINRING

BACKGROUND OF THE INVENTION

1. Field of the Invention

This invention generally relates to a bicycle chainring. More specifically, the present invention relates to a bicycle chainwheel that is made of at least two attached annular portions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One set of components that have been extensively redesigned is the bicycle power transmission gears.

Specifically, the chain engaging gears of the bicycle have been re-shaped to reduce friction and have been made more light weight to reduce the total mass of the bicycle. However, even with recent improvements in material science, the chain engaging gears contribute a measurable amount of weight to the bicycle.

In view of the above, it will be apparent to those skilled in the art from this disclosure that there exists a need for improved chain engaging gears that have a reduced weight. This invention addresses this need in the art as well as other needs, which will become apparent to those skilled in the art from this disclosure.

SUMMARY OF THE INVENTION

One object of the present invention is to provide a bicycle chainring gear with a reduced weight and improved appearance.

Another object of the present invention is to provide bicycle chainring gear that has a reduction in transmission of noise when riding, making the ride smoother and quieter.

The foregoing objects can basically be attained by providing a composite bicycle chainring that includes a first member and a second member. The first member defines a center rotational axis, a crank attachment portion with a plurality of chainring attachment openings and an annular tooth portion with a plurality of chain engaging gear teeth. The second member is disposed around the center rotational axis and is fixedly attached to overlie at least one of the crank attachment portion and the annular tooth portion to reinforce the first member without obstructing access to the chainring attachment openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a cross-sectional view of a portion of the composite bicycle chainring taken along the line 7-7 in FIG. 6 in accordance with the present invention;

FIG. 8 is a cross-sectional view of another portion of the composite bicycle chainring taken along the line 8-8 in FIG. 6 in accordance with the present invention;

FIG. 9 is a cross-sectional view of still another portion of the composite bicycle chainring taken along the line 9-9 in FIG. 6 in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
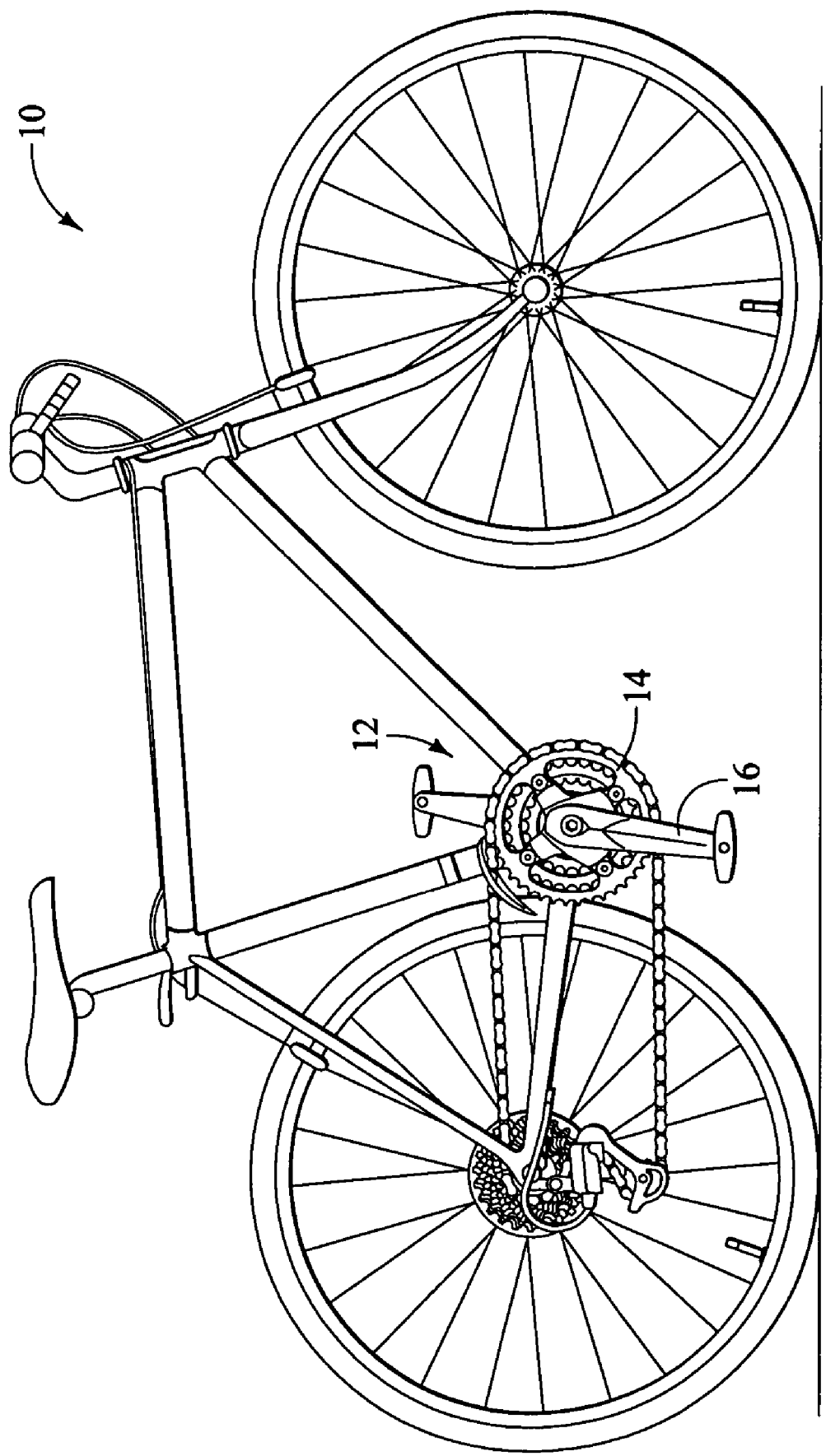
FIG. 1 is a side elevation of a bicycle with a crank assembly that includes a composite bicycle chainring in accordance with a first embodiment of the present invention.

Referring initially to FIG. 1, a bicycle 10 is illustrated that is fitted with a crank assembly 12 that includes a composite bicycle chainring 14 in accordance with the first embodiment of the present invention.

The composite bicycle chainring 14 of the present invention is a light weight chainring that includes a plurality of elements fixed to one another, as is described in greater detail below.

Figure 2:
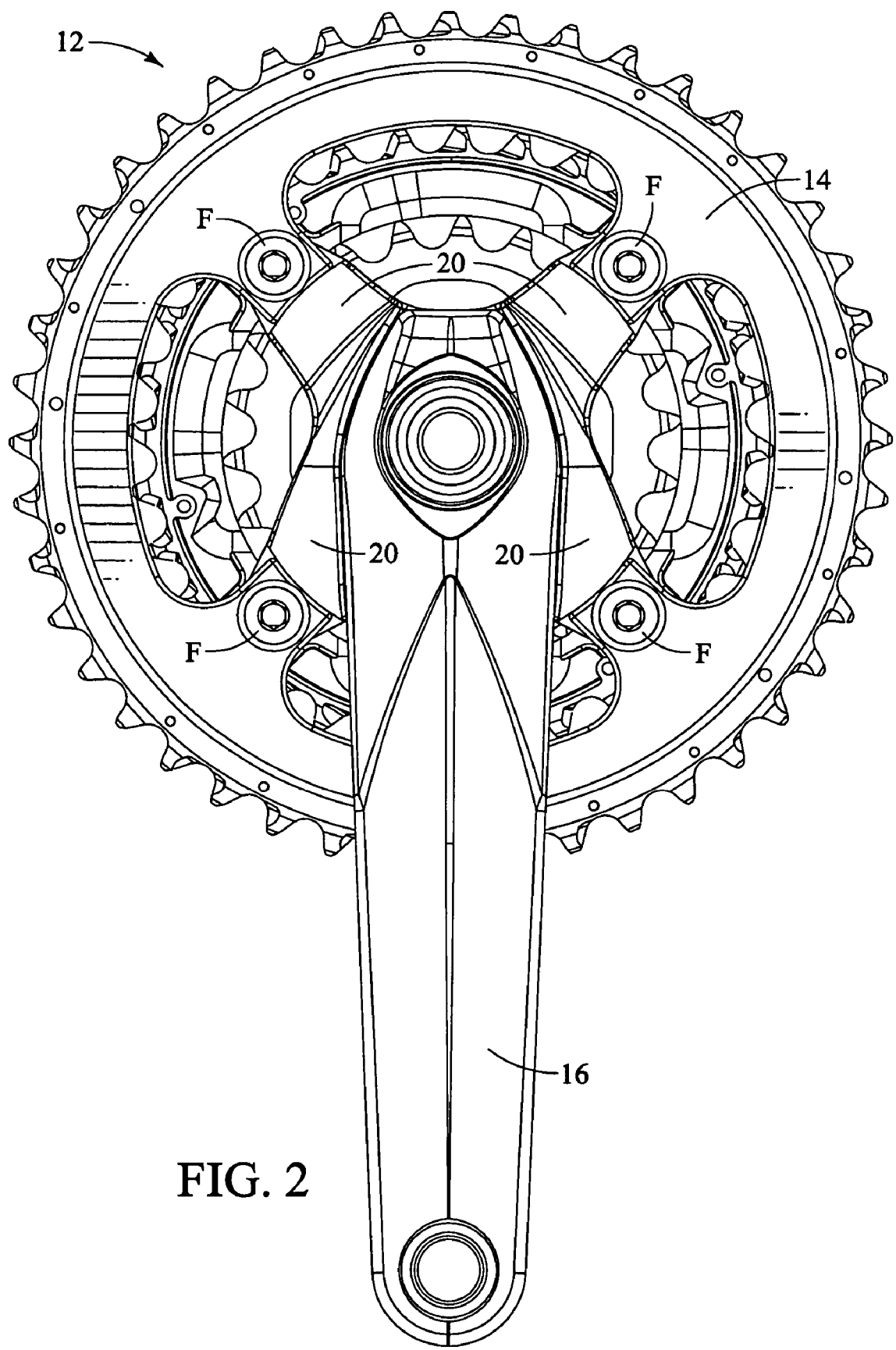
FIG. 2 is an enlarged side elevation of the crank assembly shown removed from the bicycle depicted in FIG. 1, and including the composite bicycle chainring in accordance with the present invention.
Figure 3:
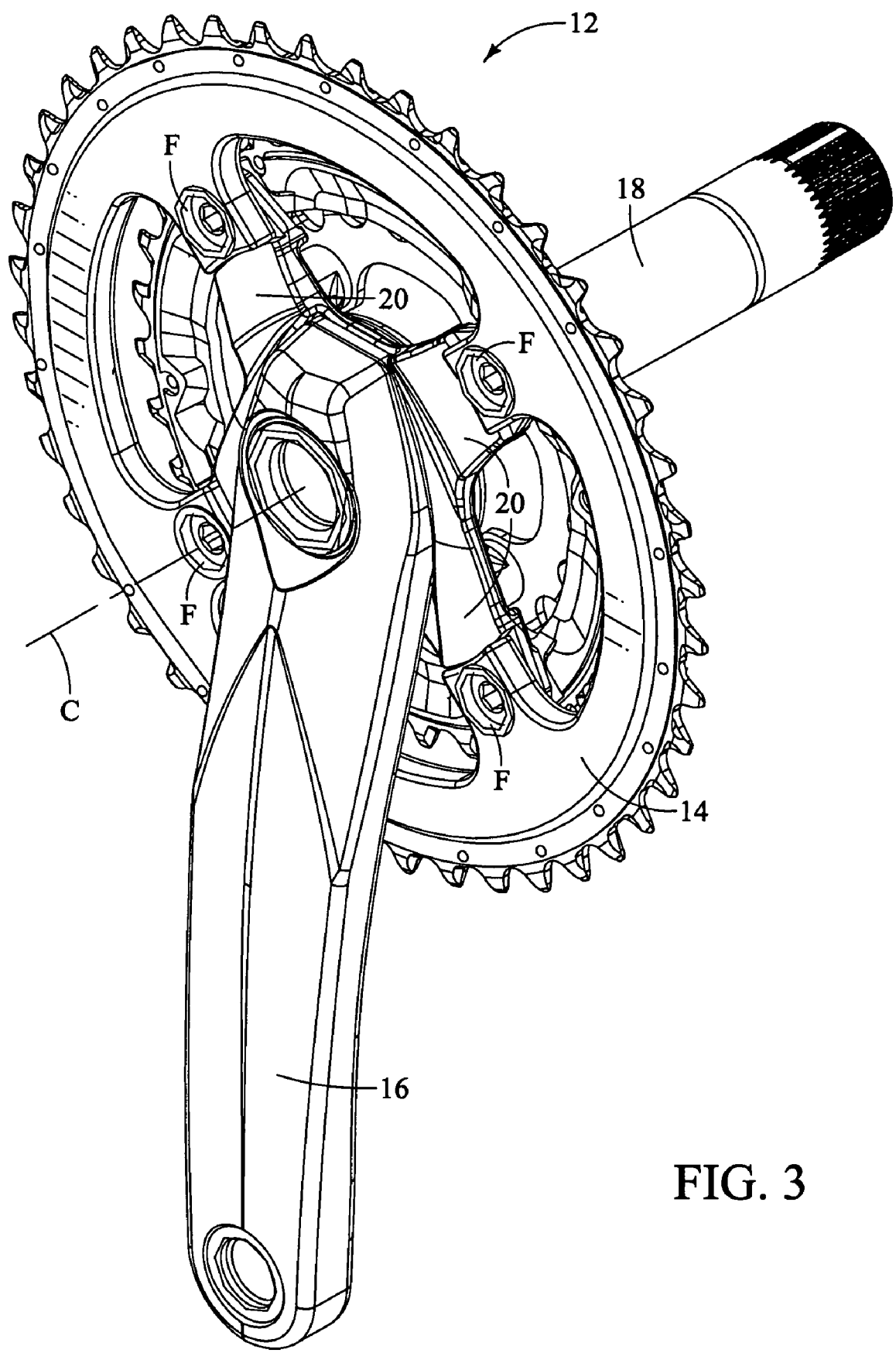
FIG. 3 is a perspective view of the crank assembly depicted in FIG. 2, showing the composite bicycle chainring and the crank assembly in accordance with the present invention.
Figure 4:
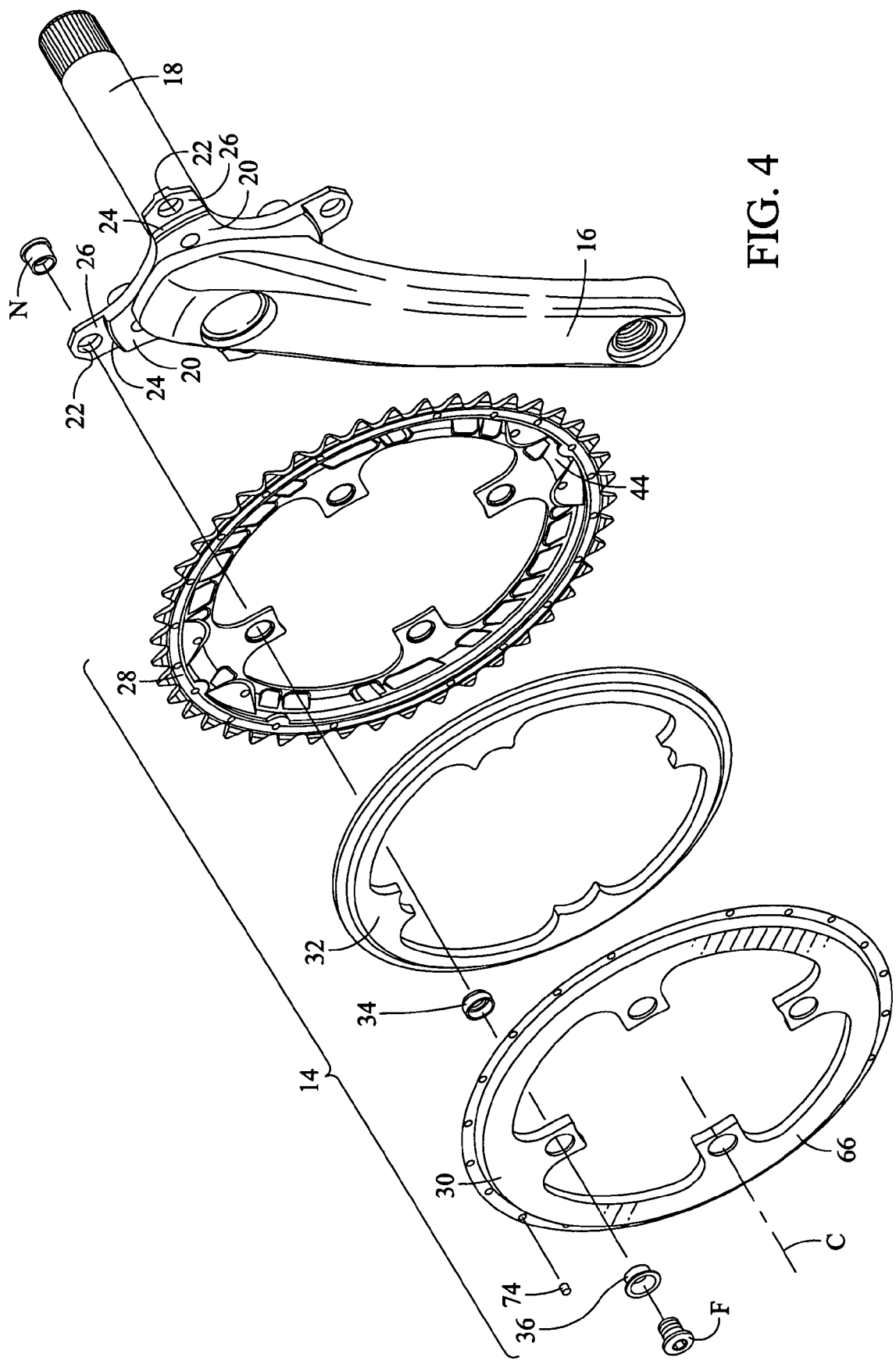
FIG. 4 is an exploded perspective view of the crank assembly depicted in FIGS. 2 and 3, showing a first member and a second member of the composite bicycle chainring in accordance with the present invention.

As shown in FIGS. 1-4, the bicycle crank assembly 12 basically includes a first crank arm 16 supported on a shaft 18 (FIG. 3). The first crank arm 16 is formed with a plurality of conventional support of portions 20 (FIGS. 2-4). As shown in FIG. 4, each of the support portions 20 include a chainring mounting aperture 22, a circumferentially extending surface 24 and radially extending surface 26. The chainring mounting apertures 22 are generally equidistantly spaced apart from the shaft 18 and each other along with corresponding circumferentially extending surfaces 24 and radially extending surfaces 26 which are formed in a conventional manner. The bicycle chainring 12 is installed on the first crank arm 16 by fasteners F and threaded nuts N.

Specifically, the fasteners F extend through apertures formed in the bicycle chainring 12 and through the chainring mounting apertures 22 where the fasteners F then thread into the threaded nuts N.

Figure 5:
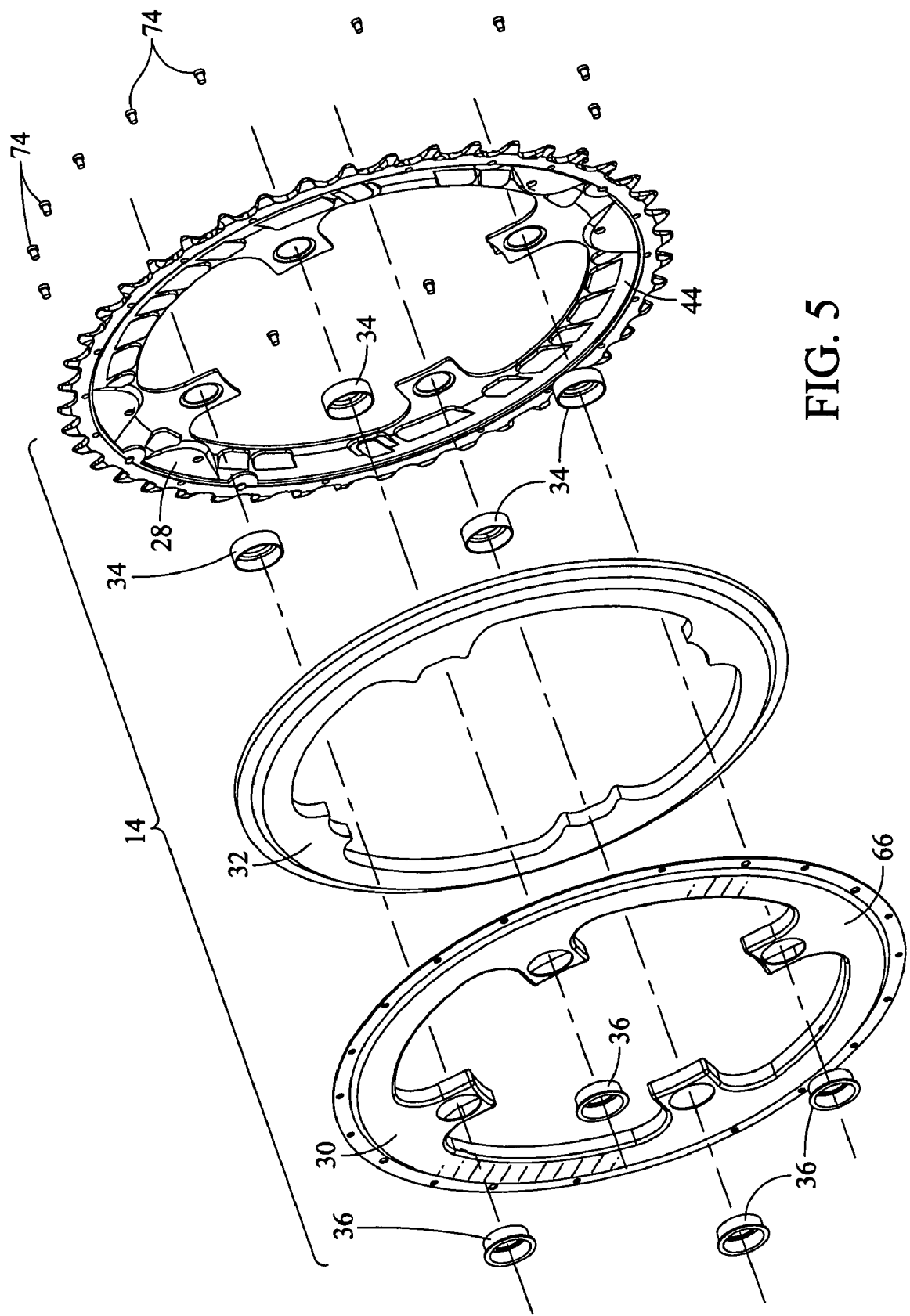
FIG. 5 is a perspective view, similar to FIG. 4, showing only the various components of the composite bicycle chainring in accordance with the present invention.
Figure 6:
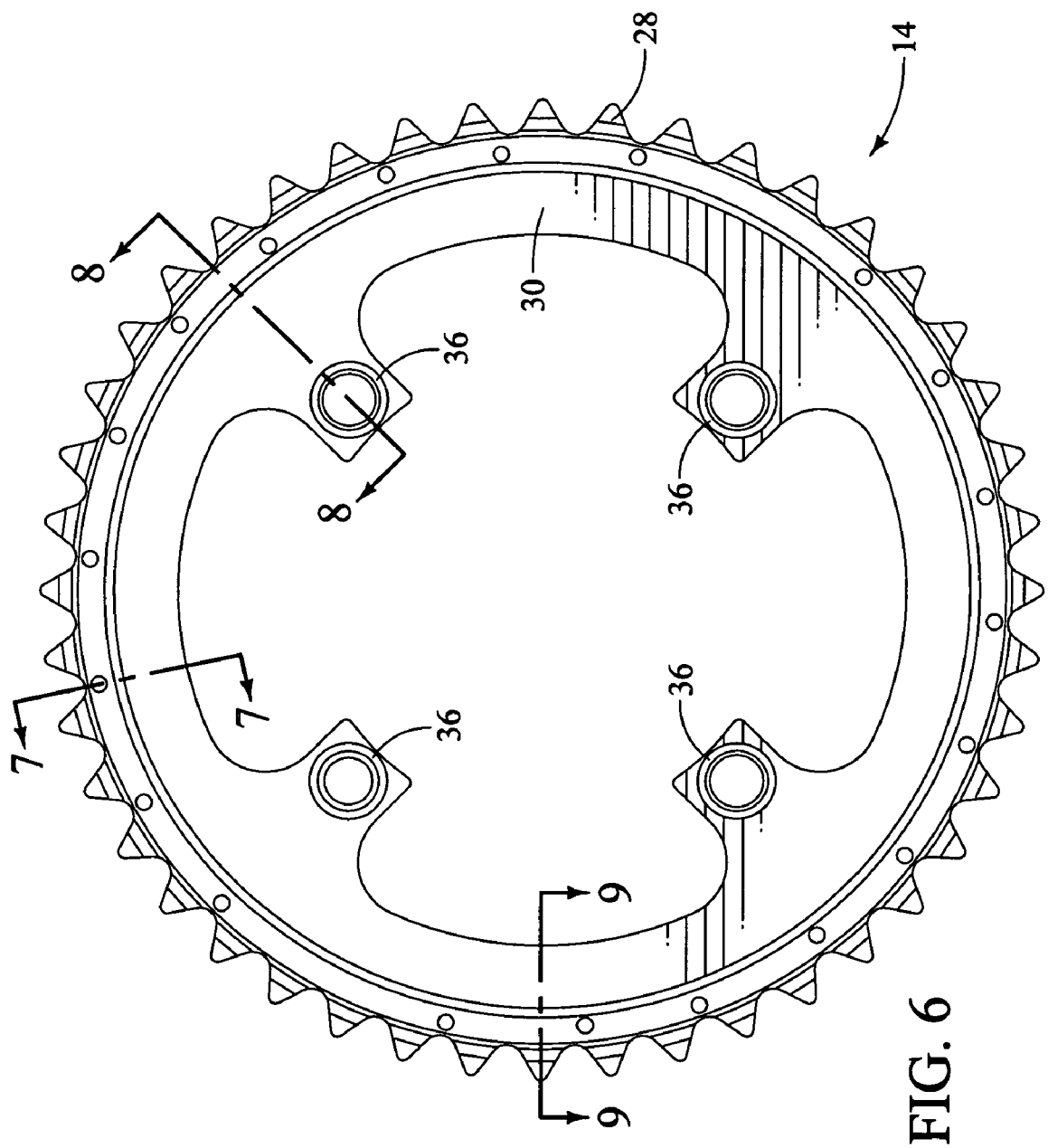
FIG. 6 is a side elevation of the composite bicycle chainring shown removed from the crank assembly in accordance with the present invention.

As shown in FIGS. 4 and 5, the bicycle chainring 12 basically includes a first member 28, a second member 30, a non-metallic filler material 32 and a plurality of tubular members, including a plurality of first fastening members 34 and a plurality of second fastening members 36. The first member 28 and the second member 30 are fixedly attached to one another with the non-metallic filler material 32 sandwiched in between, as shown in FIGS. 6-9 and described in greater detail below.

Figure 10:
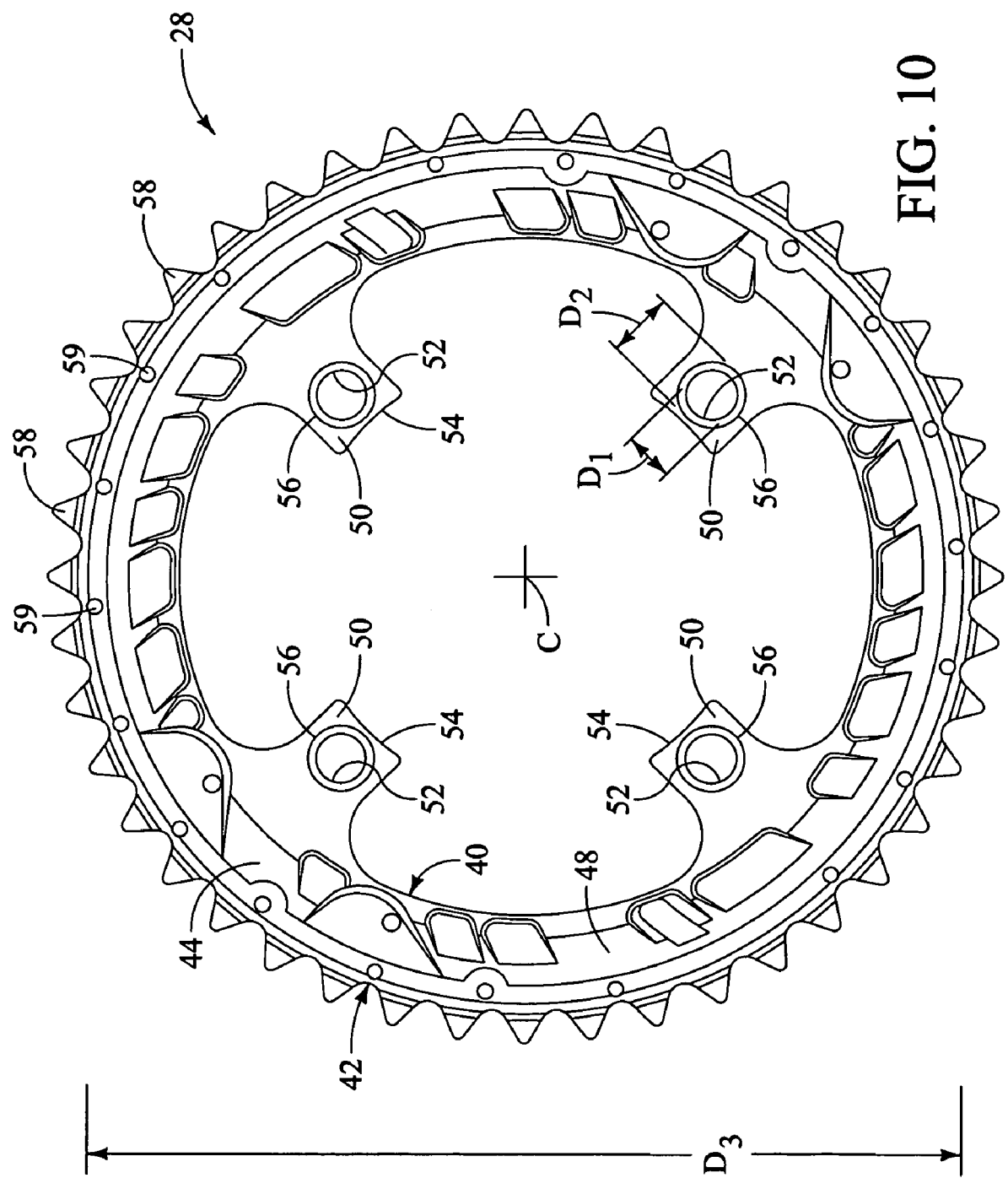
FIG. 10 is side view showing a first side of the first member of the composite bicycle chainring without the second member in accordance with the present invention.
Figure 11:
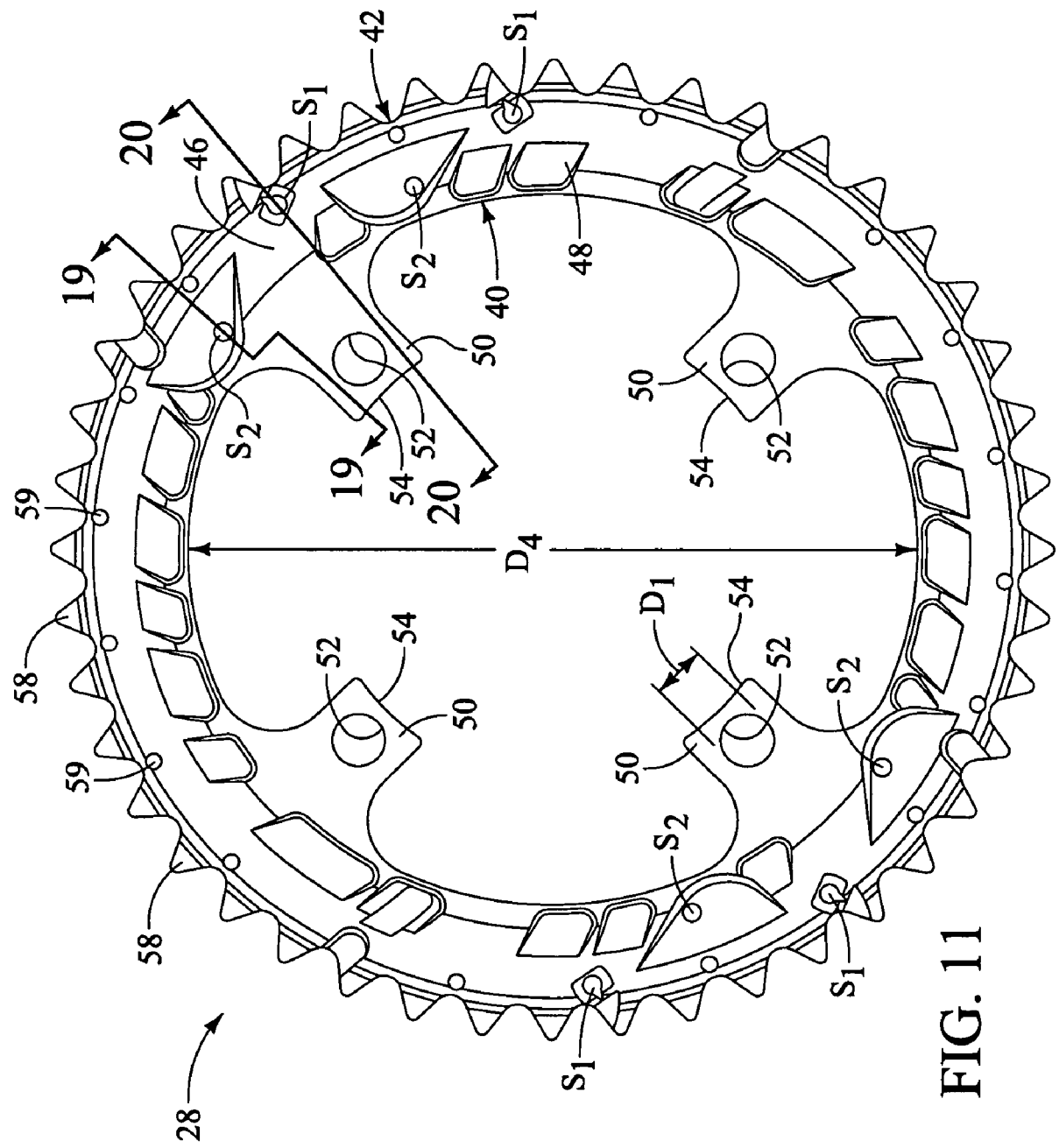
FIG. 11 is side view showing a second side of the first member of the composite bicycle chainring in accordance with the present invention; in accordance with the present invention.

As shown in FIGS. 10 and 11, the first member 28 is basically an annular shaped member that is configured to rotate about a center rotational axis C. The center rotational axis C coincides with the shaft 18 with the first member 28 installed on the support portions 20 of the first crank arm 16, as indicated in FIG. 4. The first member 28 is formed with a crank attachment portion 40 and an annular tooth portion 42. The first member 28 also has a first side 44 (FIG. 10) and a second side 46 (FIG. 11).

The crank attachment portion 40 is formed with an outer annular part 48 having a plurality of radially inward extending parts 50. Each of the radially inward extending parts 50 is formed with a corresponding chainring attachment opening 52 and a circumferentially extending surface 54. Each of the chainring attachment opening 52 extends from the first side 44 to the second side 46, as shown in FIG. 8. Further, each of the chainring attachment openings 52 is formed with a diameter $D_1$. Each of the circumferentially extending surfaces 54 is shaped to correspond to the shape of the circumferentially extending surfaces 24 of the crank arm 16. Specifically, then the composite bicycle chainring 14 is installed on the crank arm 16, each of the circumferentially extending surfaces 54 of the radially inward extending parts 50 of the first member portion 40 faces and can contact the circumferentially extending surfaces 24 of the crank arm 16.

Figure 16:
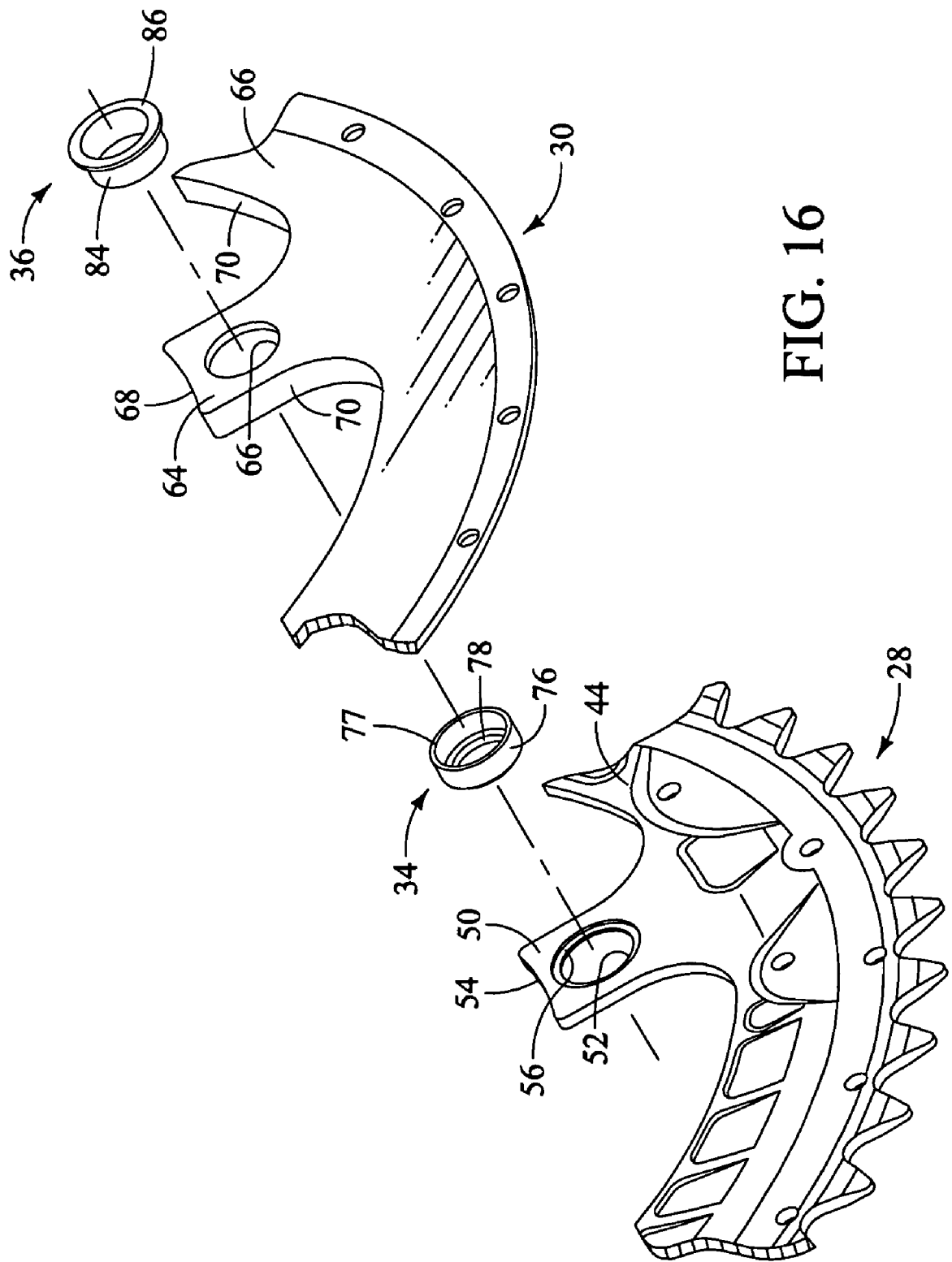
FIG. 16 is an exploded perspective view similar to FIG. 15 showing a portion of the first side of the second member being assembled to the first side of the first member using the first and second fastening tubular members in order to form the composite bicycle chainring in accordance with the present invention.
Figure 17:
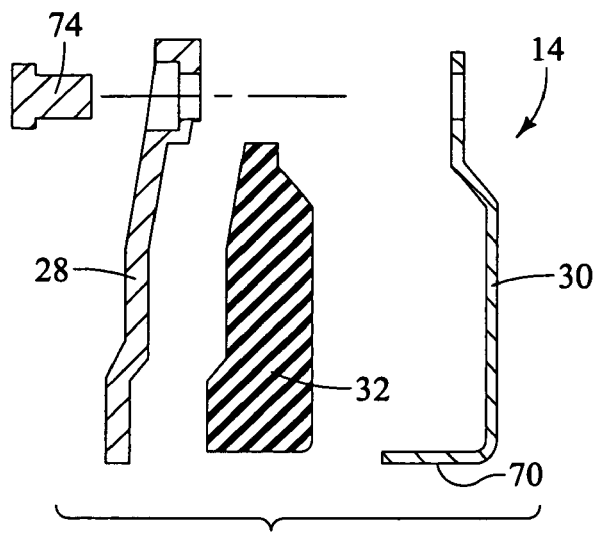
FIG. 17 is an exploded cross-sectional view of the portion of the composite bicycle chainring depicted in FIG. 7 in accordance with the present invention.
Figure 18:
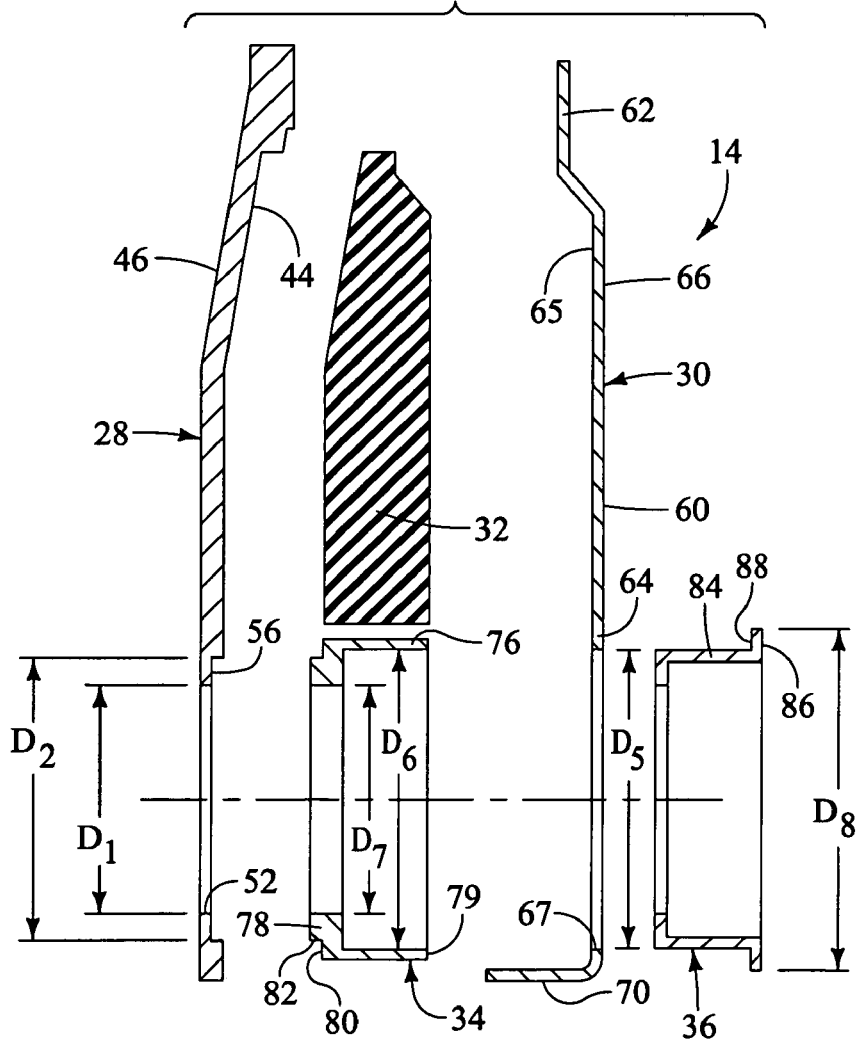
FIG. 18 is an exploded cross-sectional view of the portion of the composite bicycle chainring depicted in FIG. 8 in accordance with the present invention.

As shown in FIGS. 10, 16 and 18, on the first side 44 of the first member 28 around each of the chainring attachment openings 52 of the radially inward extending parts 50, an annular recess 56 is formed. Each of the annular recesses 56 is formed with a diameter $D_2$.

The annular tooth portion 42 of the first member 28 is located radially outward from the outer annular part 48 of the crank attachment portion 40 of the first member 28. The annular tooth portion 42 is formed with a plurality of chain engaging gear teeth 58 and a plurality of first fastening apertures 59. The chain engaging gear teeth 58 define an outer diameter $D_3$ of the first member 28, as shown in FIG. 10.

An inner radial edge of the outer annular part 48 defines an inner diameter $D_4$ the first member 28, as shown in FIG. 11.

Figure 20:
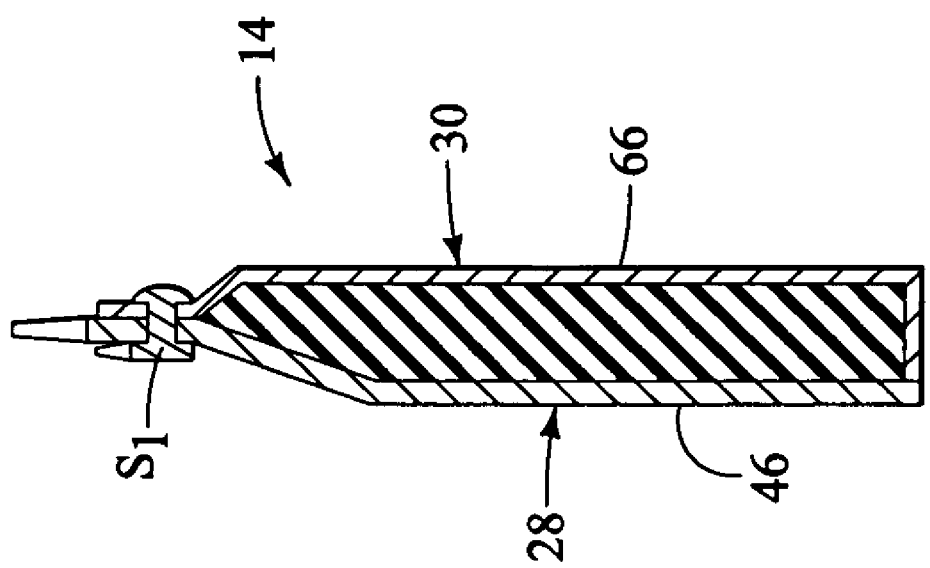
FIG. 20 is another cross-sectional view of a portion of the composite bicycle chainring taken along the line 20-20 in FIG. 11 in accordance with the present invention.
Figure 19:
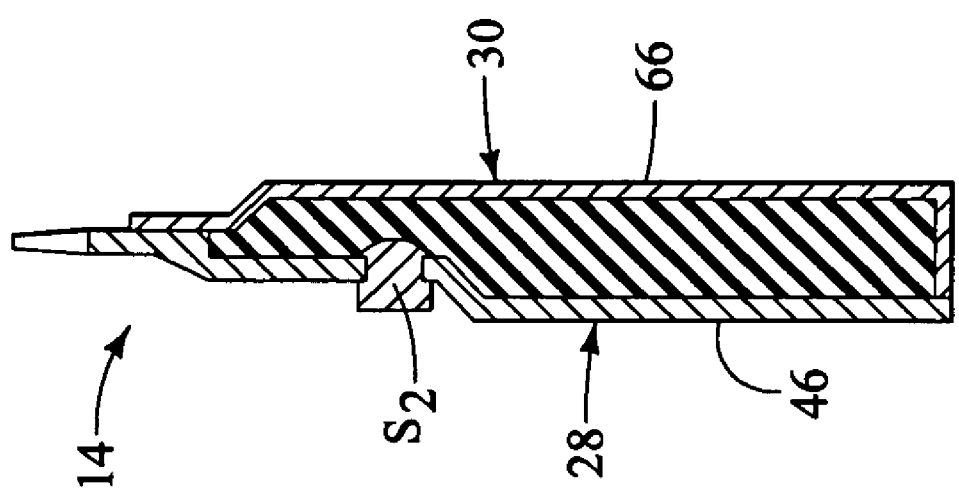
FIG. 19 is a cross-sectional view of a portion of the composite bicycle chainring taken along the line 19-19 in FIG. 11 in accordance with the present invention.

As shown in FIGS. 11, 19 and 20, the first member 28 is provided with spike rivets $S_1$ and $S_2$. Preferably, as shown in FIG. 11, four spike rivets $S_1$ are installed on the composite bicycle chainring 14 at spaced apart location. Each spike rivet $S_1$ includes a protrusion that assists in guiding a chain (not shown) during gear shifting in a manner known in the art. The spike rivets $S_1$ are installed in selected ones of the first fastening apertures 59, as shown in FIGS. 11 and 20. The spike rivets $S_2$ are similarly installed at locations radially inward of the spike rivets $S_1$, as is indicated in FIGS. 11 and 19.

Figure 12:
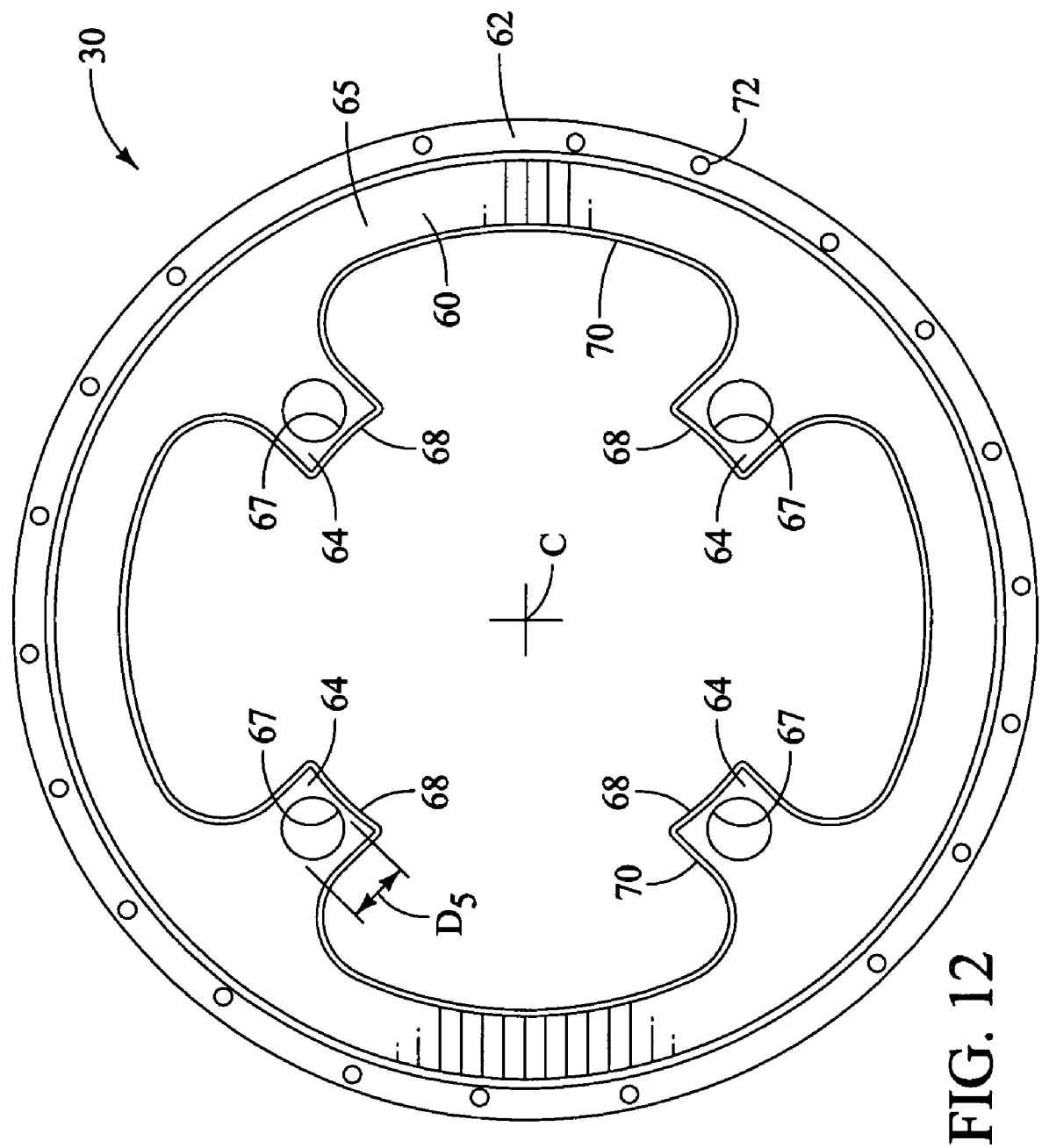
FIG. 12 is side view showing a second side of the second member of the composite bicycle chainring without the first member in accordance with the present invention.
Figure 14:
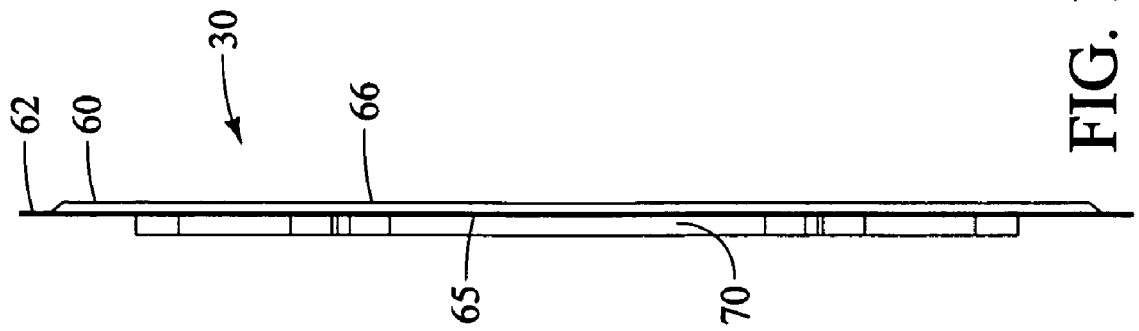
FIG. 14 is an end view showing a edge of the second member of the composite bicycle chainring in accordance with the present invention.
Figure 13:
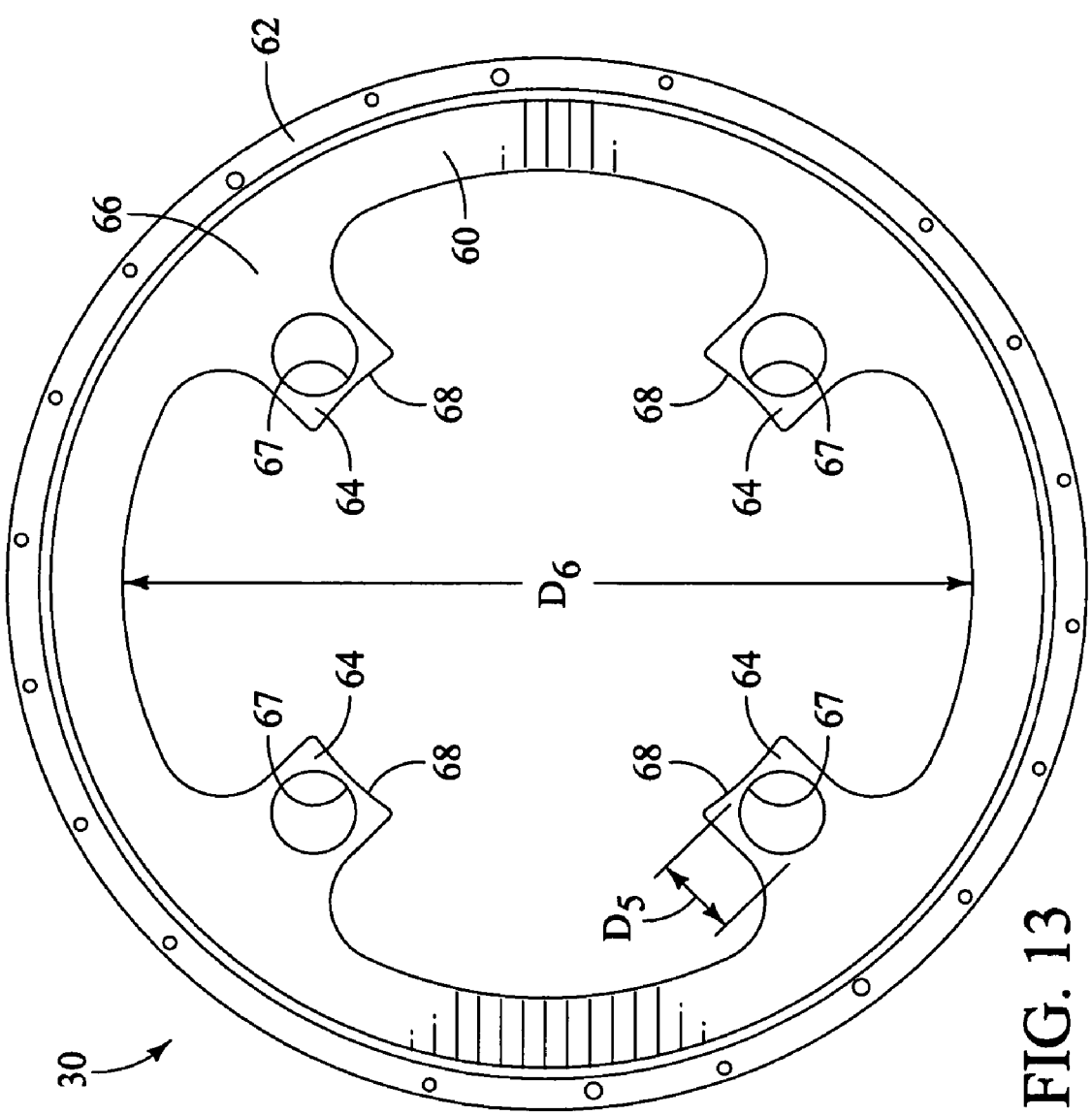
FIG. 13 is side view showing a first side of the second member of the composite bicycle chainring in accordance with the present invention.

As shown in FIGS. 12 and 13, the second member 30 is an annular shaped member that is disposed around the center rotational axis C when installed on the first member 28 and the crank arm 16. The second member 30 is preferably formed with an inner peripheral portion 60 and an outer peripheral portion 62. The inner peripheral portion 60 is formed with a plurality of radially inward extending parts 64 that extend radially inward toward the center rotational axis C. As shown more clearly in FIGS. 8 and 18, the inner peripheral portion 60 and the outer peripheral portion 62 are axially offset from one another. The second member 30 also has an inner side and an outer side, the outer side hereinafter referred to as a second side 65 (FIG. 12) and the inner side hereinafter referred to as a first side 66 (FIG. 13).

The embodiment of the present invention depicted in the drawings includes four radially inward extending parts 50 of the first member 28, four radially inward extending parts 64 of the second member 30, four first fastening members 34 and four second fastening members 36, all of which attach to the four support portions 20 of the crank assembly 12. However, it should be understood from the drawings and description herein, that the composite bicycle chainring 14 can alternatively be made with any number of these mentioned elements. For instance, in an alternative embodiments five support portions can be provided on a crank assembly, and a corresponding embodiment of the bicycle chainring 12 can be assembled having five radially inward extending parts on a first member, five radially inward extending parts on a second member, five first fastening members and five second fastening members. In still other embodiments of the present invention, only three sets or six sets of these features can be utilized.

Each of the radially inward extending parts 64 is formed with a chainring attachment opening 67 that has an inner diameter $D_5$, as shown in FIG. 13. Further, each radially inward extending part 64 is formed with a circumferentially extending surface 68 that is shaped to correspond to the shape of the circumferentially extending surfaces 24 of the crank arm 16. Specifically, then the composite bicycle chainring 14 is installed on the crank arm 16, each of the circumferentially extending surfaces 68 of the second member 30 faces and can contact the circumferentially extending surfaces 24 of the crank arm 16.

A portion of the inner peripheral portion 60 further defines an inner diameter $D_6$ of the second member 30, as shown in FIG. 13. The inner diameter $D_6$ of the second member 30 is preferably approximately equal to the inner diameter $D_4$ the first member 28. The inner periphery portion 60 of second member 30 is formed with a continuous axially extending wall 70 that extends from the second side 65 and away from the first side 66 of the second member 30. The axially extending wall 70 further extends along the edge of the inner peripheral portion 60, and extends uninterrupted along each of the radially inward extending parts 64, as shown in FIGS. 7-9, 12 and 14-16.

The outer peripheral portion 62 has a uniform outer radial edge and is formed with a plurality of second outer fastening apertures 72 that are spaced slightly radially inward from the outer radial edge. As shown in FIGS. 4, 5 and 7-9, the outer peripheral portion 62 of the second member 30 is bonded to the annular tooth portion 42 of the first member 28. The bonding between the outer peripheral portion 62 of the second member 30 and the annular tooth portion 42 of the first member 28 can be accomplished using rivets 74, an adhesive or any of a variety of welding techniques. In the instance where the rivets 74 are used, the rivets 74 are inserted into the first outer fastening apertures 59 in the first member 28 and through the second outer fastening apertures 72 of the second member 30 and deformed to secure the composite bicycle chainring 14 together. It should be understood from the drawings and description herein that the rivets 74 and the spike rivets $S_1$ are attached in generally the same manner. Further, the spike rivets $S_1$ are used in place of the rivets 74 at desired locations to fix the first member 28 to the second member 30.

The first member 28 and the second member 30 are fixedly attached to one another such that the radially extending parts 64 of the inner peripheral portion 60 of the second member 30 overlie radially inwardly extending parts 50 of the crank attachment portion 40 of the first member 28. Further, the outer peripheral portion 62 of the second member 30 overlies a radially inner part of the annular tooth portion 42 radially inward of the chain engaging gear teeth 58.

The first member 28 and the second member 30 are further fixedly attached to one another such that without obstructing access to chainring attachment openings 52 and 67. Specifically, the chainring attachment openings 52 and 67 are preferably axially aligned with one another.

As is shown more clearly in FIG. 18, the diameter $D_1$ of each of the chainring attachment openings 52 of the first member 28 is smaller that the diameter $D_5$ of the chainring attachment openings 67 of the second member 30. The diameter $D_2$ of each of the annular recesses 56 of the first member 28 is approximately the same or slightly smaller that the diameter $D_5$ of the chainring attachment openings 67 of the second member 30.

The inner peripheral portion 60 of the second member 30 has generally the same profile or shape as the crank attachment portion 40 of the first member 28. Specifically, the radially inward extending parts 50 of the first member 28 and the radially inward extending parts 64 of the second member 30 have the same overall contour and shape and can overlie each other. Consequently, the inner peripheral portion 60 of the second member 30 overlies and conforms to the shape of the crank attachment portion 40 of the first member 28 to form an interior space S (FIGS. 7-9) between the second member 30 and the first member 28.

The first member 28 is preferably made of a hard metallic material, such as a steel alloy or other metal alloy that has been provided with a hardened outer surface. Specifically, the first member 28 can be subjected to a conventional surface hardening process. The second member 30 is preferably formed without a surface hardening treatment, at least in the first embodiment. Consequently, the second member 30 is made from a material that is softer than the material of the first member 28. However, it should be understood that the second member 30 can alternatively be provided with a surface hardening treatment, depending on desired properties and intended use of the present invention.

The non-metallic filler material 32 is preferably a resilient rubber or rubber-like material that is inserted into the interior space S created between the second side 65 of the second member 30 and the first side 44 of the first member 28. The non-metallic filler material 32 can be made of any of a variety of materials that provide sound and/or vibration dampening, such as various foam materials, plastics, polymers or rubber-based materials.

Figure 15:
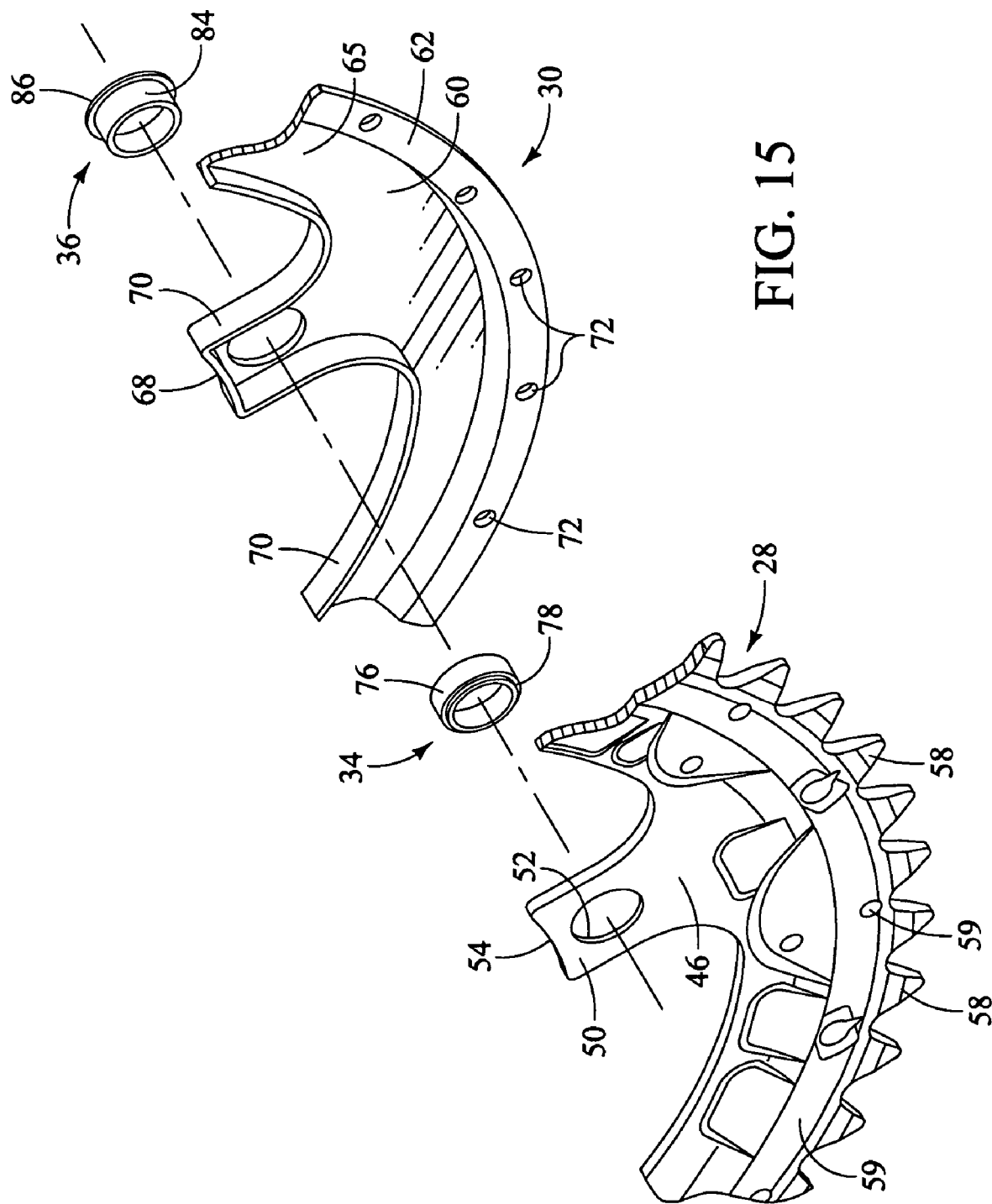
FIG. 15 is an exploded perspective view showing a portion of the second side of the first member being assembled to the second side of the second member using first and second fastening tubular members in order to form the composite bicycle chainring in accordance with the present invention.

The plurality of first fastening members 34 are tubular members best shown in FIGS. 15, 16 and 18. Each of the first fastening members 34 includes two hollow portions, a main body portion 76 and a recessed portion 78. The main body portion 76 has an inner diameter $D_6$ and an outer cover abutment surface 79. The recessed portion 78 has an inner diameter $D_7$ that is smaller than the inner diameter $D_6$. The recessed portion 78 is formed with a two abutment surfaces 80 and 82. The abutment surface 80 is dimensioned to contact the first side 44 of the first member 28 when the first fastening member 34 is inserted into the chainring attachment opening 52. The abutment surface 82 of the recessed portion 78 has an outer diameter that is generally the same as the diameter $D_2$ of the annular recess 56 around the chainring attachment opening 52. Therefore, when the first fastening members 34 are inserted into corresponding chainring attachment openings 52, the abutment surface 82 engages the surface of the annular recess 56 centering the first fastening members 34 and restricting movement thereof. Further, the inner diameter $D_6$ of the first fastening members 34 is approximately the same size or slightly larger than the diameter $D_5$ of the chainring attachment opening 67.

When the composite bicycle chainring 14 is assembled, the recessed portion 78 of each of the first fastening members 34 is inserted into respective ones of the annular recess 56 of the radially inward extending parts 50 of the first member 28. Correspondingly, since the inner diameter $D_6$ of the first fastening members 34 is approximately the same size or slightly larger than the diameter $D_5$ of the chainring attachment opening 67, the outer cover abutment surfaces 79 of the first fastening members 34 contact the second side 65 of the second member 30 in the region around the chainring attachment openings 67.

The plurality of second fastening members 36 are also tubular members that are best shown in FIGS. 15, 16 and 18. Each of the second fastening members 36 includes two hollow portions, a main body portion 84 and an abutment portion 86. The main body portion 84 has an outer diameter that is approximately the same or slightly smaller than each of the inner diameter $D_6$ of the main body portion 76 of the first fastener members 34 and the diameter $D_5$ of the chainring attachment openings 67 of the second member 30. Preferably, the main body portion 84 has an outer diameter that allows the second fastener members 36 to be inserted into or nested within the first fastening members 34. The abutment portion 86 has an outer diameter $D_8$ that is larger than the inner diameter $D_5$ of the chainring attachment openings 67 of the second member 30. The abutment portion 86 includes an abutment surface 88.

When the composite bicycle chainring 14 is assembled, the main body portion 84 of each of the second fastening members 36 is inserted into respective ones of the chainring attachment openings 67 of the second member 30. Further, the main body portion 84 of each of the second fastening members 36 concentrically extends into the hollow interior of corresponding main body portions 76 of the first fastening members 34. Lastly, the abutment surface 88 of the abutment portion 86 is brought into contact with the first side 66 of the second member 30 in the area around the chainring attachment openings 67 of the second member 30 to complete the basic assembly of the composite bicycle chainring 14 with the first and second fastening members 34 and 36.

Once the composite bicycle chainring 14 is assembled together, the first and second fastening members 34 and 36 are preferably bonded to one another. The bonding can be accomplished by slightly deforming the first and second fastening members 34 and 36 such that friction keeps them together. Alternatively, the bonding between the first and second fastening members 34 and 36 can be accomplished using an adhesive material or welding. In another alternative configuration, the first and second fastening members 34 and 36 can be left loosely fitted together and held together by the fasteners F and threaded nuts N. As indicated in FIGS. 4 and 5, the fasteners F are installed such that they extend through the second fastening members 36 and then engage the threaded nuts N. Once tightened, the fasteners F and threaded nuts N hold the first and second fastening members 34 and 36 firmly in place in engagement with one another.

As shown in the drawings, the second member 30 and the first member 28 are fixedly coupled together by a plurality of the first and second fastening members 34 and 36 (tubular fastening members). During the assembly process, the chainring attachment openings 52 of the first member 28 are brought into alignment with the chainring attachment openings 67 of the second member 30. Consequently, the first and second fastening members 34 and 36 are axially aligned with respective ones of the chainring attachment openings 52 and the chainring attachment openings 67.

Second Embodiment

Figure 21:
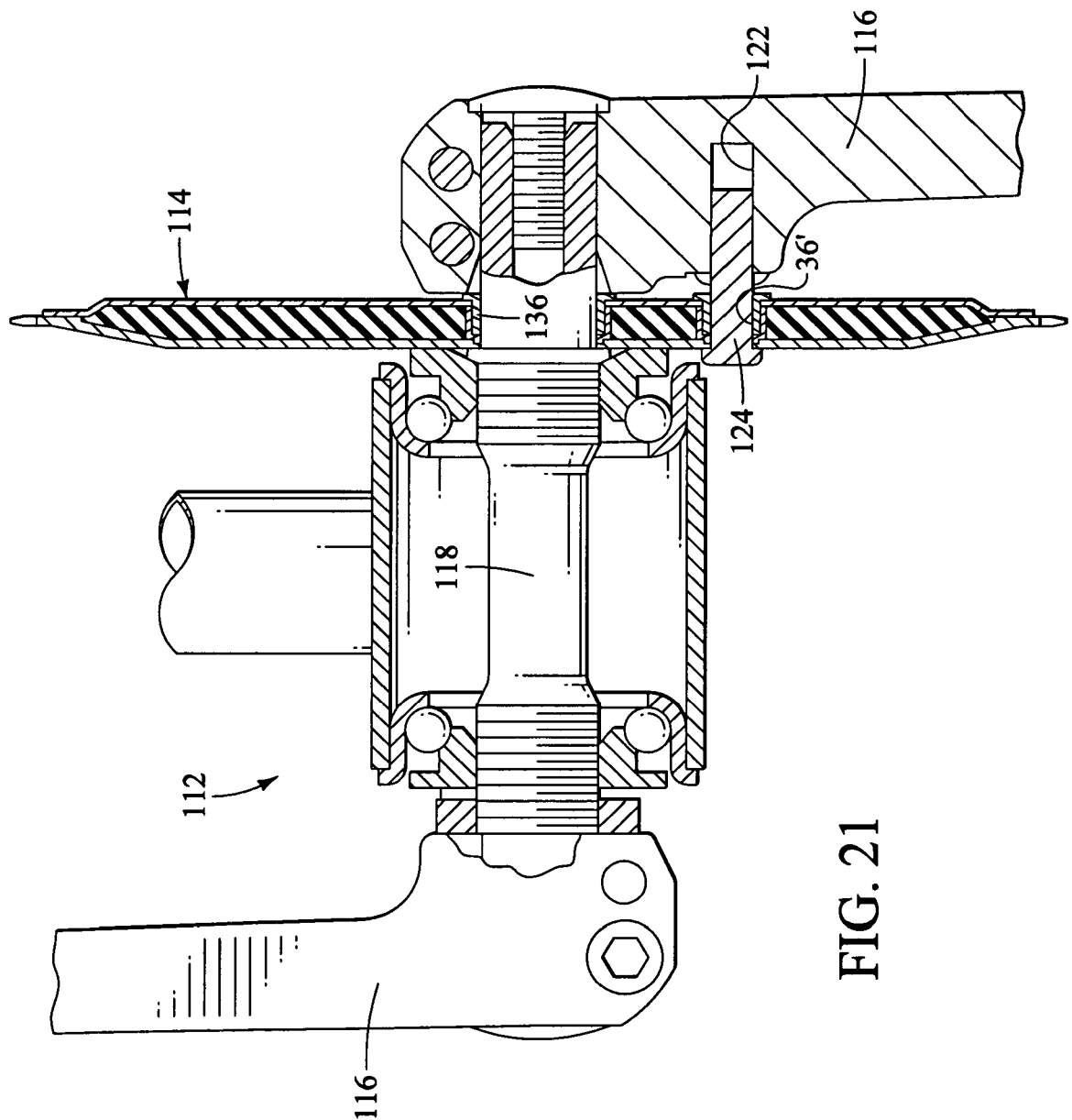
FIG. 21 is a fragmentary cross-sectional view of a bicycle with a crank assembly that includes a composite bicycle chainring in accordance with a second embodiment of the present invention.
Figure 22:
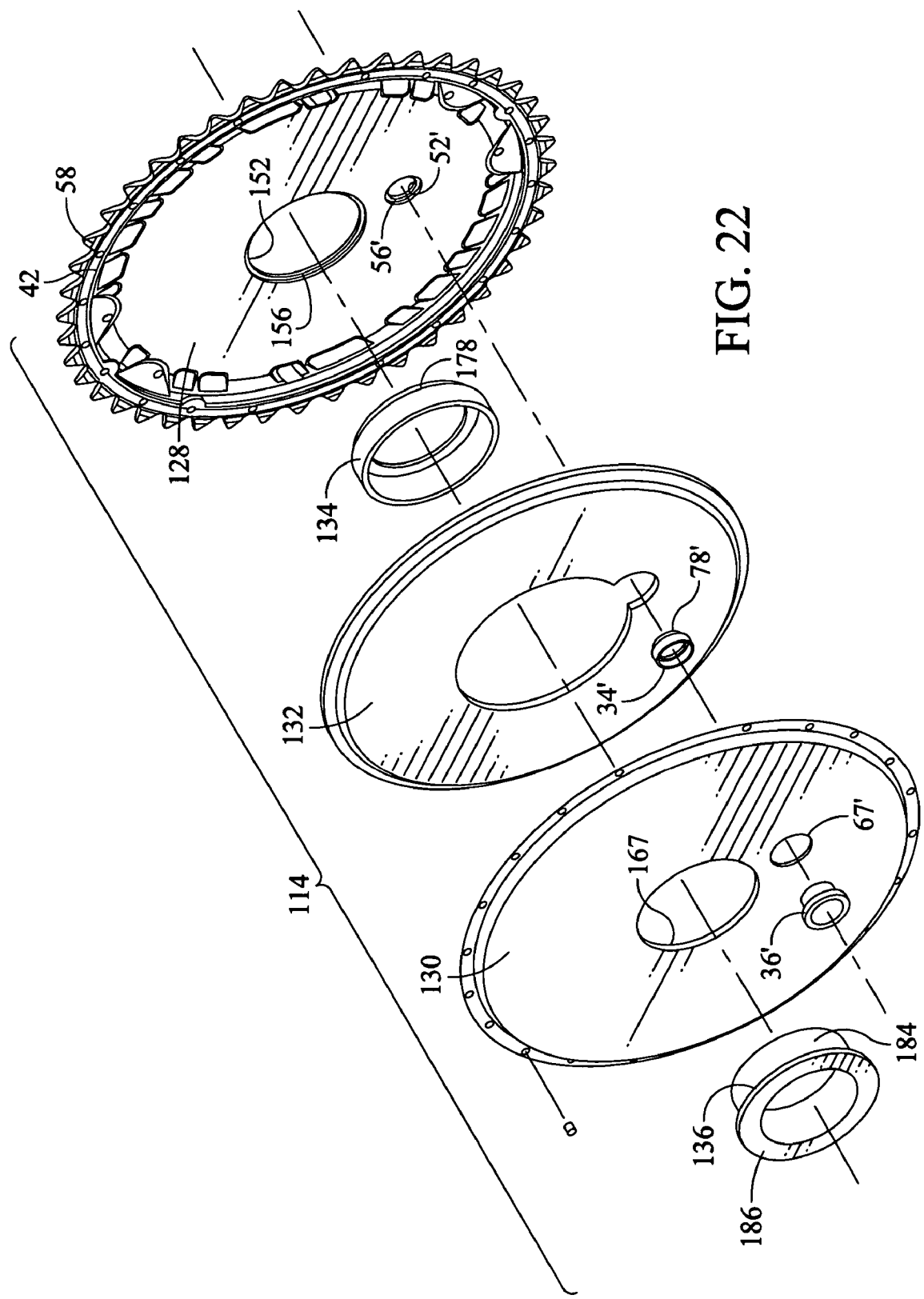
FIG. 22 is an exploded perspective view of the composite bicycle chainring depicted in FIG. 21, showing a first member and an second member of the composite bicycle chainring in accordance with the second embodiment of the present invention.
Figure 23:
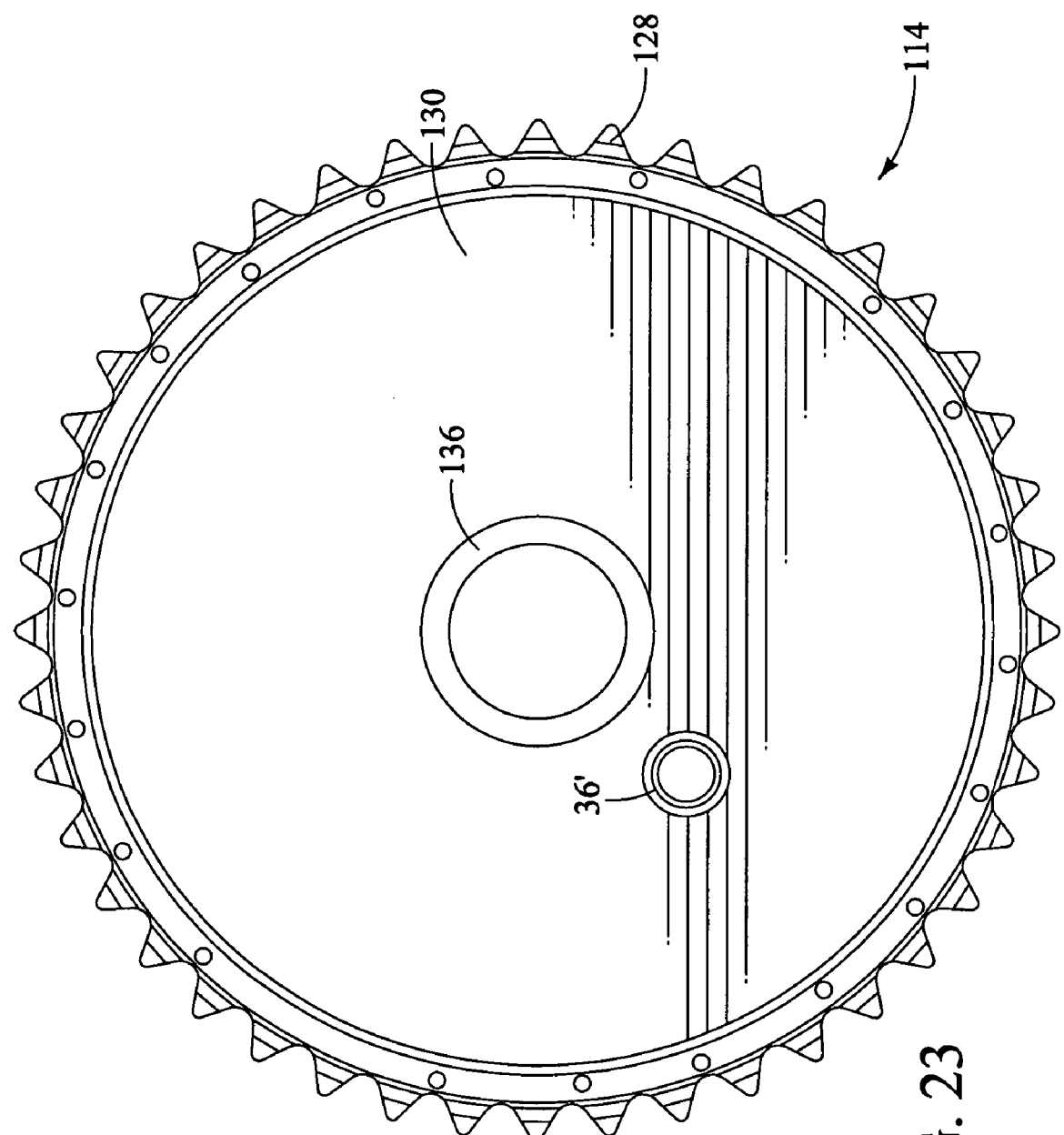
FIG. 23 is a side elevation of the composite bicycle chainring shown removed from the crank assembly in accordance with the second embodiment of the present invention.
Figure 25:
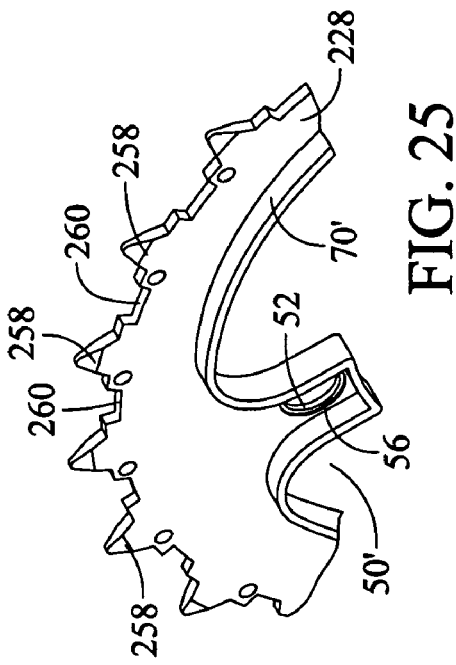
FIG. 25 is a fragmentary perspective view showing a portion of a second member of the composite bicycle chainring in accordance with the third embodiment of the present invention.
Figure 24:
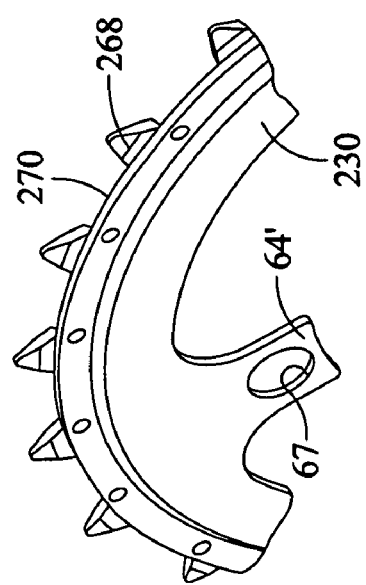
FIG. 24 is a fragmentary perspective view showing a portion of a first member of a composite bicycle chainring in accordance with a third embodiment of the present invention.
Figure 27:
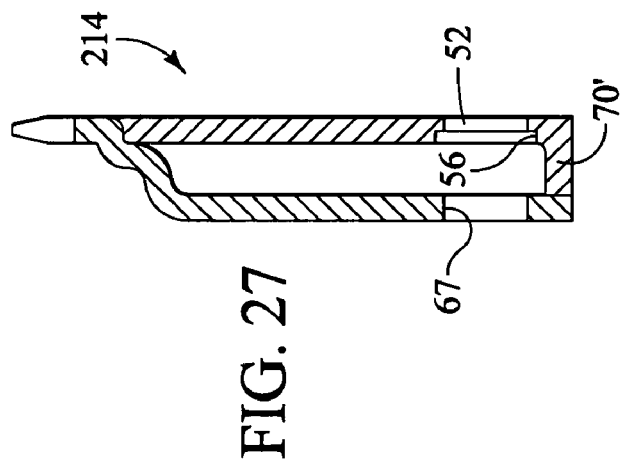
FIG. 27 is a fragmentary cross-sectional view of the composite bicycle chainring taken along the line 27-27 in FIG. 26, in accordance with the third embodiment of the present invention.
Figure 26:
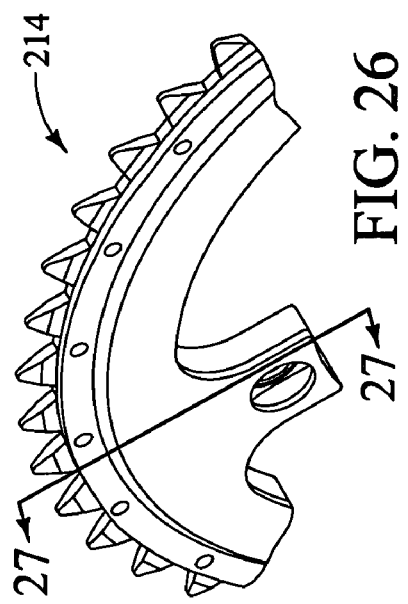
FIG. 26 is a fragmentary perspective view showing a portion of the first and second members of the composite bicycle chainring in accordance with the third embodiment of the present invention.
Figure 29:
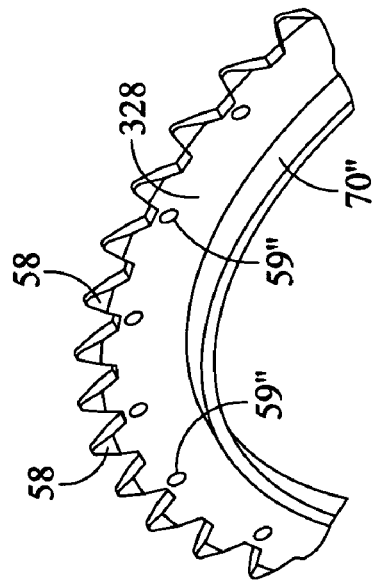
FIG. 29 is a fragmentary perspective view showing a portion of a second member of the composite bicycle chainring in accordance with the fourth embodiment of the present invention.
Figure 31:
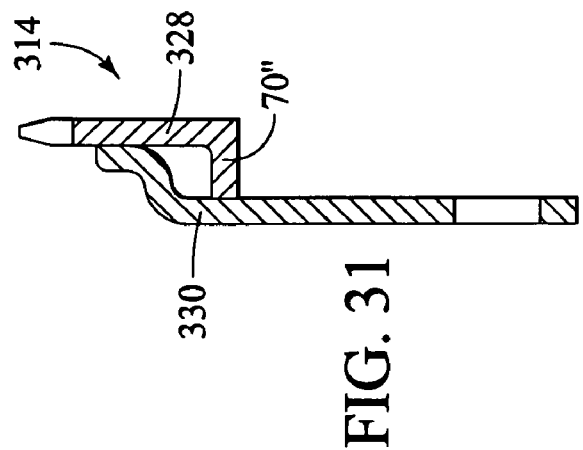
FIG. 31 is a fragmentary cross-sectional view of the composite bicycle chainring taken along the line 31-31 in FIG. 30, in accordance with the third embodiment of the present invention.
Figure 28:
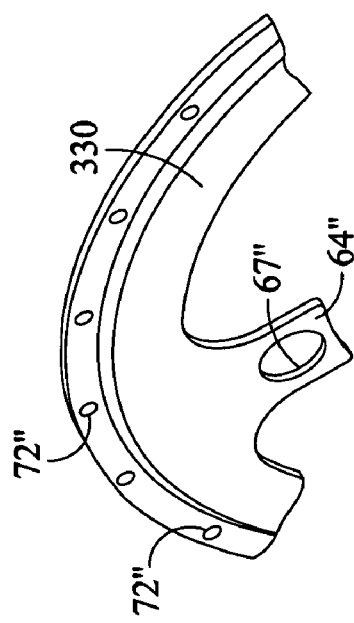
FIG. 28 is a fragmentary perspective view showing a portion of a first member of a composite bicycle chainring in accordance with a fourth embodiment of the present invention.
Figure 30:
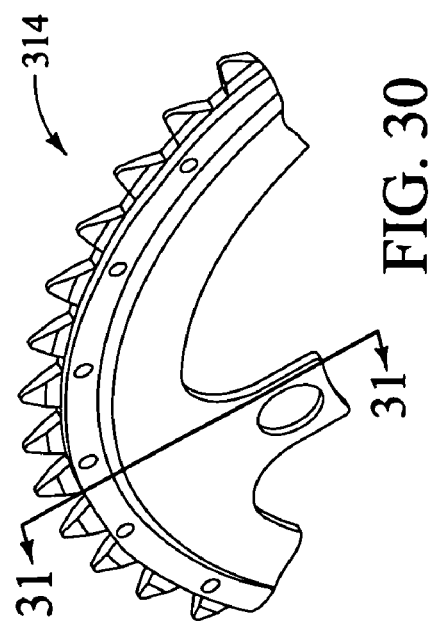
FIG. 30 is a fragmentary perspective view showing a portion of the first and second members of the composite bicycle chainring in accordance with the fourth embodiment of the present invention.

Referring now to FIGS. 21, 22 and 23, a crank assembly 112 that includes a bicycle chainring 114 in accordance with a second embodiment of the present invention will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ slightly from the parts of the first embodiment will be indicated with a single prime (') or will be provided with a new reference numeral.

The crank assembly 112 is generally configured for use with a bicycle that only includes a single gear element at the front portion of the drive train of the bicycle. Specifically, the crank assembly 112 includes the bicycle chainring 114 without other gears or chainrings. The crank assembly 112 basically includes crank arms 116 and a shaft 118 that extends between the crank arms 116. One of the crank arms 116 includes a threaded aperture 122 that receives a single fastener 124.

As shown in FIG. 22, the bicycle chainring 114 basically includes a first member 128, an second member 130, a non-metallic filler material 132, a single first fastening member 34' and a single second fastening member 36' and a large pair of tubular members including a third fastening member 134 and a fourth fastening member 136. The first member 128 and the annular outer cover 130 are fixedly attached to one another with the non-metallic filler material 132 sandwiched in between.

The first member 128 is similar to the first member 28 of the first embodiment, except that the first member 128 is formed with a central opening 152 and a single attachment opening 52'. The central opening 152 is formed with an annular recess 156. The single attachment opening 52' is formed with an annular recess 56' that is the same as the annular recess 56 in the first embodiment. Like the first member 28 of the first embodiment, the first member 128 of the second embodiment is formed with an annular tooth portion 42 and a plurality of chain engaging gear teeth 58. The annular recess 56' is dimensioned to receive the recessed portion 78' of the first fastening member 34' in a manner similar to the first embodiment.

The second member 130 is generally the same as the second member 30 of the first embodiment, except that the second member 130 is formed with a central opening 167 and a single attachment opening 67'.

The non-metallic filler material 132 is generally the same as the non-metallic filler material 32 of the first embodiment except that the non-metallic filler material 132 is larger in order to fill the space between the first member 128 and the second member 130.

The first fastening member 34' is formed with the recessed portion 78' that is fitted into the annular recess 56' about the attachment opening 52' in the first member 128. The second fastening member 36' is installed in the single attachment opening 67' in the second member 130 and further extends into the hollow interior of the first fastening member 34'.

The second fastening member 36' can be permanently fixed or bonded to the first fastening member 34' by any of a variety of attachment methods, such as deformation, bonding by adhesive or welding techniques.

The third fastening member 134 has an outer diameter that is larger than the first fastening member 34' but has a configuration similar to the first fastening member 34'. For instance, the third fastening member 134 includes a recessed portion 178 that is dimensioned to fit into the annular recess 156 formed about the central opening 152 in the first member 128.

The fourth fastening member 136 is formed with a main body portion 184 and an abutment portion 186 in a manner similar to the second fastening member 36' and the second fastening members 36 of the first embodiment. The main body portion 184 of the fourth fastening member 136 is fitted into the central opening 167 of the second member 130, and into the hollow interior of the third fastening member 134. The fourth fastening member 136 can be permanently fixed or bonded to the third fastening member 134 by any of a variety of attachment methods, such as deformation, bonding by adhesive or welding techniques. As can be seen in FIG. 21, the fourth fastening member 136 is formed with an inner diameter that is approximately the same as the outer diameter of the shaft 118.

Once assembled, the bicycle chainring 114 is installed on the crank assembly 112 as shown in FIG. 21. Specifically, the shaft 118 is fitted into the hollow interiors of the fourth fastening members 136 such that the bicycle chainring 114 rotates with the shaft 118. The bicycle chainring 114 is fixed for rotation with the shaft 118 by installation of the single fastener 124 through the second fastener second fastening member 36' and into the threaded aperture 122 on the crank arm 116.

Third Embodiment

Referring now to FIGS. 24, 25, 26 and 27, a bicycle chainring 214 in accordance with a third embodiment of the present invention will now be explained. In view of the similarity between the first, second and third embodiments, the parts of the third embodiment that are identical to the parts of the first or second embodiments will be given the same reference numerals as the parts of the first or second embodiments. Moreover, the descriptions of the parts of the third embodiment that are identical to the parts of the first or second embodiment may be omitted for the sake of brevity.

The bicycle chainring 214 basically includes a first member 228 and a second member 230. The first member 228 includes a plurality of radially inward extending parts 50' (although only one is shown), a plurality of spaced apart gear teeth 258, recesses 260 and an axially extending wall 70'. Each of the radially inward extending parts 50' is formed with a chainring attachment opening 52 that is encircled by an annular recess 56. The plurality of spaced apart gear teeth 258 and the recesses 260 alternate around the outer periphery of the first member 228.

The axially extending wall 70' is operably the same as the axially extending wall 70 described above with respect to the first embodiment.

The second member 230 is formed with a plurality of radially inward extending parts 64' (although only one is shown) and a plurality of spaced apart gear teeth 268 that are separated from one another by radially extending surfaces 270. Each extending part 64' is formed with chainring attachment openings 67, as in the first embodiment. When assembled, the gear teeth 268 fit into the recesses 260 of the first member 228 such that the gear teeth 268 and the gear teeth 258 are generally co-plane.

Although not shown in the drawings, the bicycle chainring 214 includes non-metallic filler material and first and second fastening members 34 and 36 which engage annular recess 56 and the chainring attachment openings 67 of the first and second members 228 and 230, respectively, in a manner generally the same as in the first embodiment.

Fourth Embodiment

Referring now to FIGS. 28, 29, 30 and 31, a bicycle chainring 314 in accordance with a fourth embodiment of the present invention will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The bicycle chainring 314 basically includes a first member 328 and a second member 330. The first member 328 is formed with a plurality of gear teeth 58, a plurality of fastening apertures 59" and an annular axially extending wall 70".

The second member 330 is formed with a plurality of fastening apertures 72" and a plurality of radially inward extending parts 64" that include chainring attachment openings 67".

The first and second members 328 and 330 are fixed together by rivets (not shown) that extend through the respective fastening apertures 59" and 72". A non-metallic filler material (not shown) is installed between the first and second members 328 and 330. The bicycle chainring 314 is installed onto a crank assembly (not shown) by fasteners that extend through the chainring attachment openings 67".

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chainring having a center rotational axis comprising:
a first member having an annular shape; and
a second member having an annular shape,
at least one of the first member and the second member being formed with an annular tooth portion with a plurality of chain engaging gear teeth,
the first member including a crank attachment portion with a plurality of chainring attachment openings, and the second member including an inner peripheral portion with a plurality of chainring attachment openings,
the first and second members being fixedly attached to overlie each other without obstructing access to the chainring attachment openings of the first and second members, and
the inner peripheral portion overlying the crank attachment portion of the first member and being formed with an axially extending wall that is disposed axially between the first and second members with respect to the center rotational axis and that extends toward the first member in an axial direction along the center rotational axis, the axially extending wall including at least first and second wall portions located at each of the chainring attachment openings of the second member, the at least first and second wall portions extending along an inner edge of the inner peripheral portion with a hollow interior area being at least partially formed axially between axially spaced faces of the first and second members and between the at least first and second wall portions of the axially extending wall.

2. The bicycle chainring as set forth in claim 1, wherein the first member and the second member are fixedly coupled together at the annular tooth portion of the first member.

3. The bicycle chainring as set forth in claim 1, wherein the first member and the second member are fixedly coupled together at the crank attachment portion of the first member.

4. The bicycle chainring as set forth in claim 3, wherein the first member and the second member are fixedly coupled together at the annular tooth portion of the first member.

5. The bicycle chainring as set forth in claim 2, wherein the first member and the second member are fixedly coupled together by a plurality of rivets.

6. The bicycle chainring as set forth in claim 2, wherein the first member and the second member are fixedly coupled together by welding.

7. The bicycle chainring as set forth in claim 2, wherein the first member and the second member are fixedly coupled to together by an adhesive material.

8. The bicycle chainring as set forth in claim 3, wherein the first member and the second member are fixedly coupled together by a plurality of tubular fastening members with one of the tubular members being axially aligned with each of the chainring attachment openings.

9. The bicycle chainring as set forth in claim 8, wherein each of the tubular fastening members includes a first fastening member and a second fastening member.

10. The bicycle chainring as set forth in claim 9, wherein the first and second fastening members of each of the tubular fastening members are concentrically arranged.

11. The bicycle chainring as set forth in claim 9, wherein each of the first fastening members includes a first tubular section and a pair of oppositely facing abutment surfaces that abut against interior axially facing surfaces of the second member and the first member, and
each of the second fastening members includes a second tubular section and an abutment element extending radially from the second tubular section to abut against an exterior axially facing surface of one of the second member and the first member.

12. The bicycle chainring as set forth in claim 1, wherein the second member includes an outer peripheral portion overlying an inner part of the annular tooth portion of the first member at a location that is disposed radially inward of the chain engaging gear teeth.

13. The bicycle chainring as set forth in claim 12, wherein the chainring attachment openings of the second member are axially aligned with the chainring attachment openings of the first member.

14. The bicycle chainring as set forth in claim 13, wherein the first member and the second member are fixedly coupled to together by a plurality of tubular fastening members with one of the tubular members being axially aligned with a respective pair of the chainring attachment openings of the first and second members.

15. The bicycle chainring as set forth in claim 14, wherein each of the tubular fastening members includes a first fastening member and a second fastening member that are nested together.

16. The bicycle chainring as set forth in claim 14, wherein each of the chainring attachment openings of the second member has an outer diameter that is larger than an outer diameter of each of the chainring attachment openings of the first member.

17. The bicycle chainring as set forth in claim 1, further comprising
a non-metallic filler material at least partially disposed in the hollow interior area.

18. The bicycle chainring as set forth in claim 17, wherein the filler material is a resilient material.

19. The bicycle chainring as set forth in claim 1, wherein the second member is made from a first material that is softer than a second material of the first member.

20. The bicycle chainring as set forth in claim 1, wherein the crank attachment portion of the first member includes an outer annular part with a plurality of radially inward extending parts that include the chainring attachment openings of the first member.

21. The bicycle chainring as set forth in claim 20, wherein the inner peripheral portion of the second member includes a plurality of radially inward extending parts and the second member further includes an outer peripheral portion,
the radially inward extending parts of the first member and the second member overlying each other, and
the outer peripheral portion of the second member overlying the outer annular part of the crank attachment portion of the first member.

22. The bicycle chainring as set forth in claim 21, wherein the chainring attachment openings of the second member are axially aligned with the chainring attachment openings of the first member.

23. The bicycle chainring as set forth in claim 22, wherein the first member and the second member are fixedly coupled to together by a plurality of tubular fastening members with one of the tubular members being axially aligned with a respective pair of the chainring attachment openings of the first and second members.

24. The bicycle chainring as set forth in claim 1, wherein the first member and the second member are concentrically and fixedly coupled together about the center rotational axis.

* * * * *